United States Patent
Cantelar

(10) Patent No.: US 12,310,532 B1
(45) Date of Patent: May 27, 2025

(54) TELESCOPIC PIZZA OVEN

(71) Applicant: Eduardo M Cantelar, Miami, FL (US)

(72) Inventor: Eduardo M Cantelar, Miami, FL (US)

( * ) Notice: Subject to any disclaimer, the term of this patent is extended or adjusted under 35 U.S.C. 154(b) by 0 days.

(21) Appl. No.: 19/058,359

(22) Filed: Feb. 20, 2025

(51) Int. Cl.
 *A47J 37/06* (2006.01)
(52) U.S. Cl.
 CPC .................. *A47J 37/0658* (2013.01)
(58) Field of Classification Search
 CPC ............ A47J 37/0658; A47J 37/0664; A47J 37/0704; A47J 37/0786; A47J 2037/0777; F24C 1/16
 See application file for complete search history.

(56) References Cited

U.S. PATENT DOCUMENTS

| | | | | |
|---|---|---|---|---|
| 847,117 A | * | 3/1907 | Salmon | A47J 37/0704 312/107 |
| 2014/0345594 A1 | * | 11/2014 | Rhodes | A47J 37/0704 126/25 R |
| 2016/0227965 A1 | * | 8/2016 | Johnston | A47J 37/0704 |
| 2019/0313851 A1 | * | 10/2019 | Shemp | A47J 37/0718 |
| 2020/0015626 A1 | * | 1/2020 | Corso | A47J 37/0704 |
| 2020/0146505 A1 | * | 5/2020 | Bell | A47J 37/0623 |
| 2020/0167790 A1 | * | 5/2020 | Newman | H04W 4/021 |

FOREIGN PATENT DOCUMENTS

CN 111878853 A * 11/2020

* cited by examiner

*Primary Examiner* — Hung D Nguyen
(74) *Attorney, Agent, or Firm* — Ruben Alcoba, Esq.

(57) ABSTRACT

An improved telescopic pizza oven designed to enhance convection cooking efficiency. The telescopic pizza oven comprises a bottom annular ring and a top annular ring that is telescopically mounted onto the bottom annular ring, allowing for adjustable height configurations. A rectangular grill is inserted within the top annular ring to support food placement. The top annular ring features a difference in wall heights, which promotes enhanced convection airflow within the oven, ensuring even heat distribution for optimal cooking performance. This structure provides improved versatility, efficiency, and convenience for users seeking enhanced cooking capabilities in a compact, adjustable pizza oven.

9 Claims, 6 Drawing Sheets

TELESCOPIC PIZZA OVEN

TECHNICAL FIELD

The present invention relates to the field of culinary appliances, specifically to portable cooking devices. More particularly, it pertains to an improved telescopic pizza oven designed for efficient use in outdoor and travel environments. This invention addresses the need for compact, collapsible cooking appliances that are easy to transport and store, making it ideal for recreational vehicles, camping, and other mobile settings where traditional large, permanent pizza ovens are impractical.

BACKGROUND

The present invention is an improved telescopic pizza oven. The inventor of the present invention previously patented a telescopic pizza oven, U.S. patent Ser. No. 12/127,707, issued on Oct. 29, 2024, titled Telescopic Wood Fired Pizza Oven. The present invention has improved the invention by providing a convection element to the present invention that is due to the differential in wall heights in the cooking area of the present invention.

As previously described in the patent Ser. No. 12/127,707, pizza ovens have been a staple in culinary traditions around the world, known for their ability to cook pizzas at high temperatures, resulting in crispy crusts and perfectly melted toppings. Traditional wood-fired pizza ovens are often large, permanent structures that require significant space and installation effort. However, there is a growing need for portable, efficient, and compact pizza ovens that maintain the authentic wood-fired cooking experience.

This need is particularly pronounced in travel environments, such as recreational vehicles (RVs), where space is at a premium. Travelers and RV owners often face challenges in finding cooking appliances that are easy to store and transport without compromising on functionality. A portable pizza oven that is easy to store in small spaces and simple to ship can significantly enhance the convenience and quality of outdoor cooking experiences.

The telescopic pizza oven meets these needs by providing a collapsible design that saves space when not in use. This feature is especially beneficial in RVs, where every inch of space must be utilized efficiently. The telescopic feature allows the oven to be compactly stored, making it an ideal solution for those who love to cook while on the move. This design ensures that pizza enthusiasts can enjoy authentic wood-fired pizzas without the bulk and permanence of traditional pizza ovens, making it perfect for camping trips, RV adventures, and other mobile lifestyles.

SUMMARY

The present invention pertains to an improved telescopic pizza oven that features an adjustable telescopic structure and that provides efficient convection cooking.

The telescopic pizza oven comprises of a bottom annular ring, a top annular ring that telescopically mounts on the bottom annular ring, and a rectangular grill that inserts within the top annular ring.

The top annular ring has a difference in wall heights that promotes convection within the telescopic pizza oven.

The present invention is designed to be placed on top of a fire pit, preferably a collapsible fire pit as described in U.S. patent Ser. No. 12/000,593, issued to the present inventor on Jun. 4, 2024, titled Telescopic Fire Pit.

The height differential between the front and rear walls of the top annular ring, when heat is applied at the bottom of the improved telescopic pizza oven, creates convection currents within the top annular ring that promotes the browning and cooking of foods within the improved telescopic pizza oven.

An object of the present invention is to provide a telescopic pizza oven that is easy to assemble and disassemble.

Another object of the present invention is to provide a telescopic pizza oven that can easily be stored and transported.

BRIEF DESCRIPTION OF THE DRAWINGS

These and other features, aspects, and advantages of the present invention will become better understood with regards to the following description, appended claims, and drawings where:

DESCRIPTION

Figure 1:
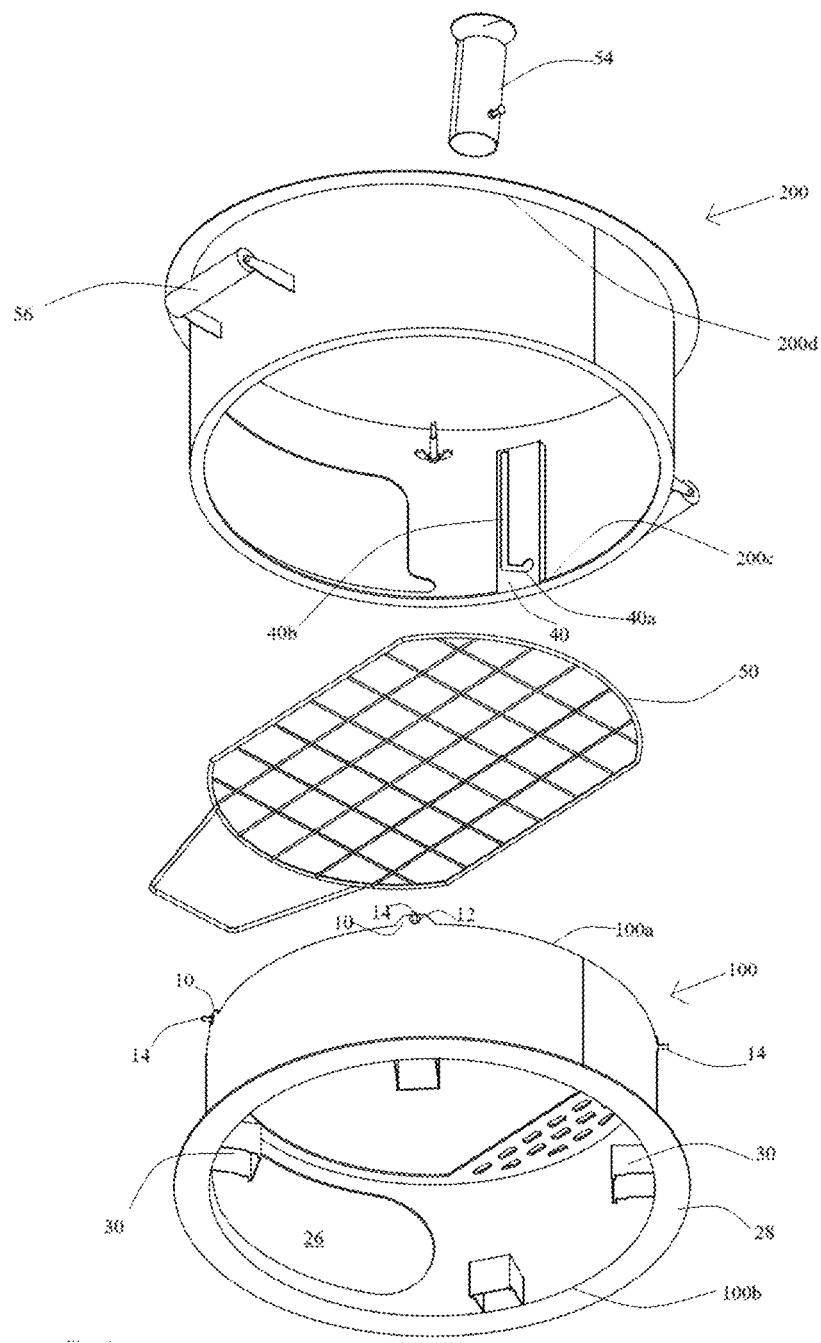
FIG. 1 is an upward exploded perspective view of the present invention.
Figure 2:
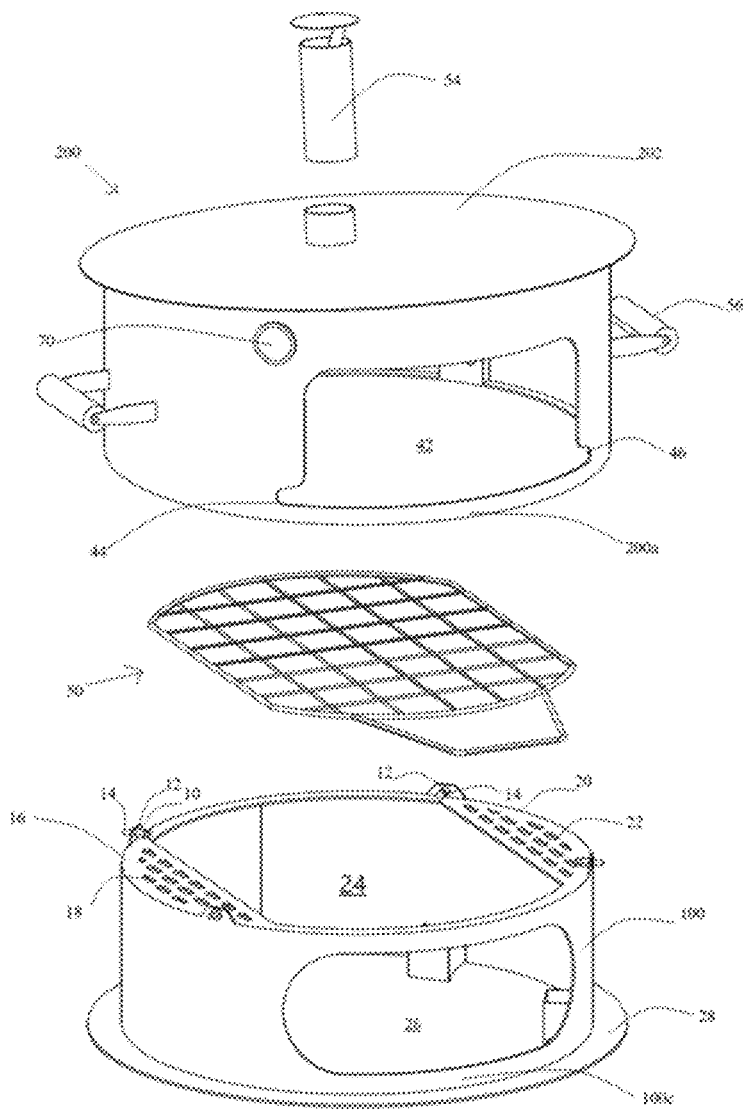
FIG. 2 is a downward exploded perspective view of the present invention.
Figure 3:
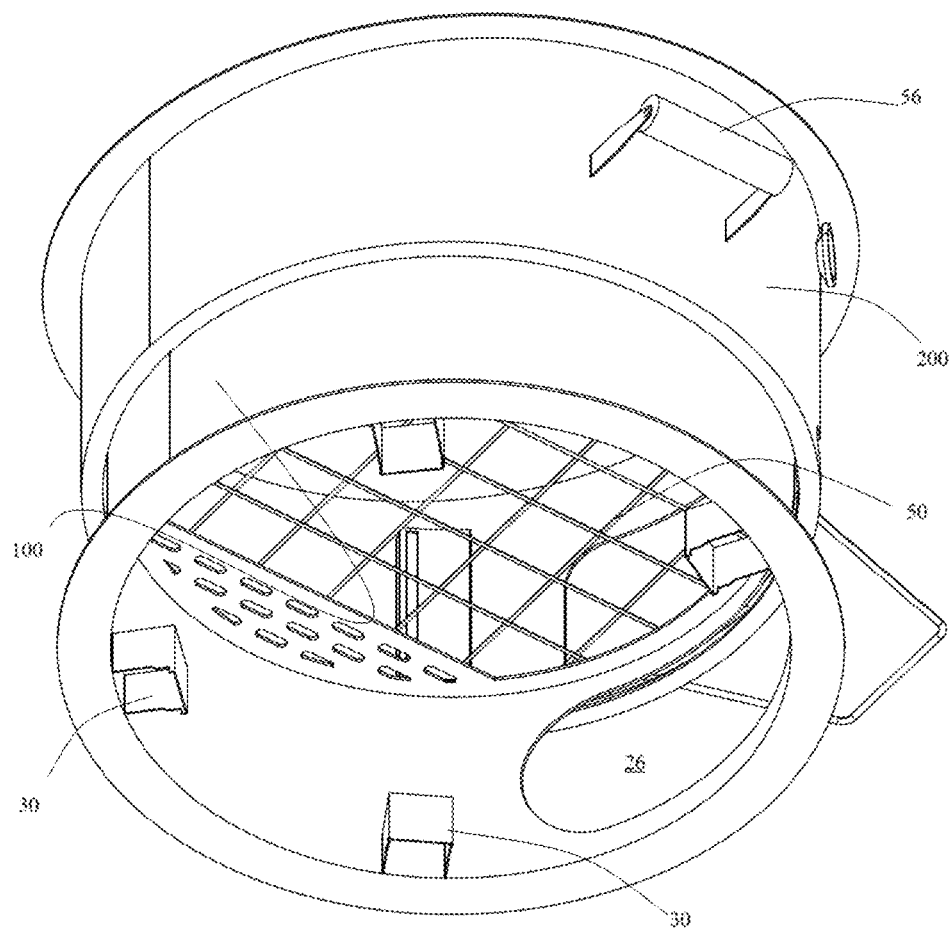
FIG. 3 is an upward perspective view of the present invention in an expanded position.
Figure 4:
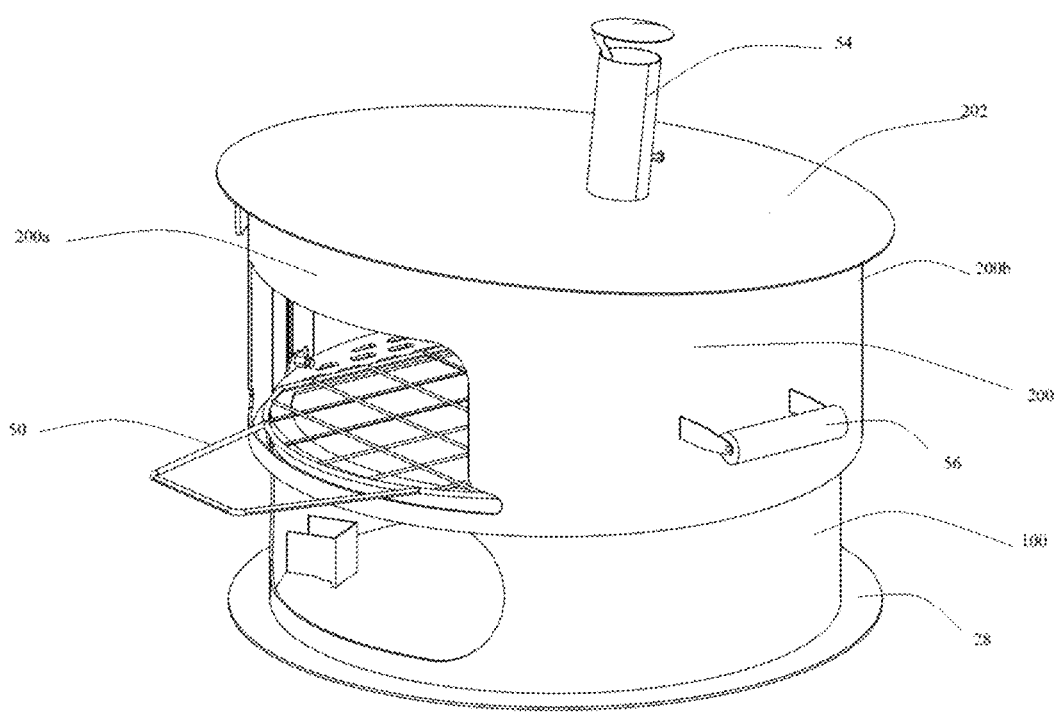
FIG. 4 is a downward exploded perspective view of the present invention in an expanded position.
Figure 5:
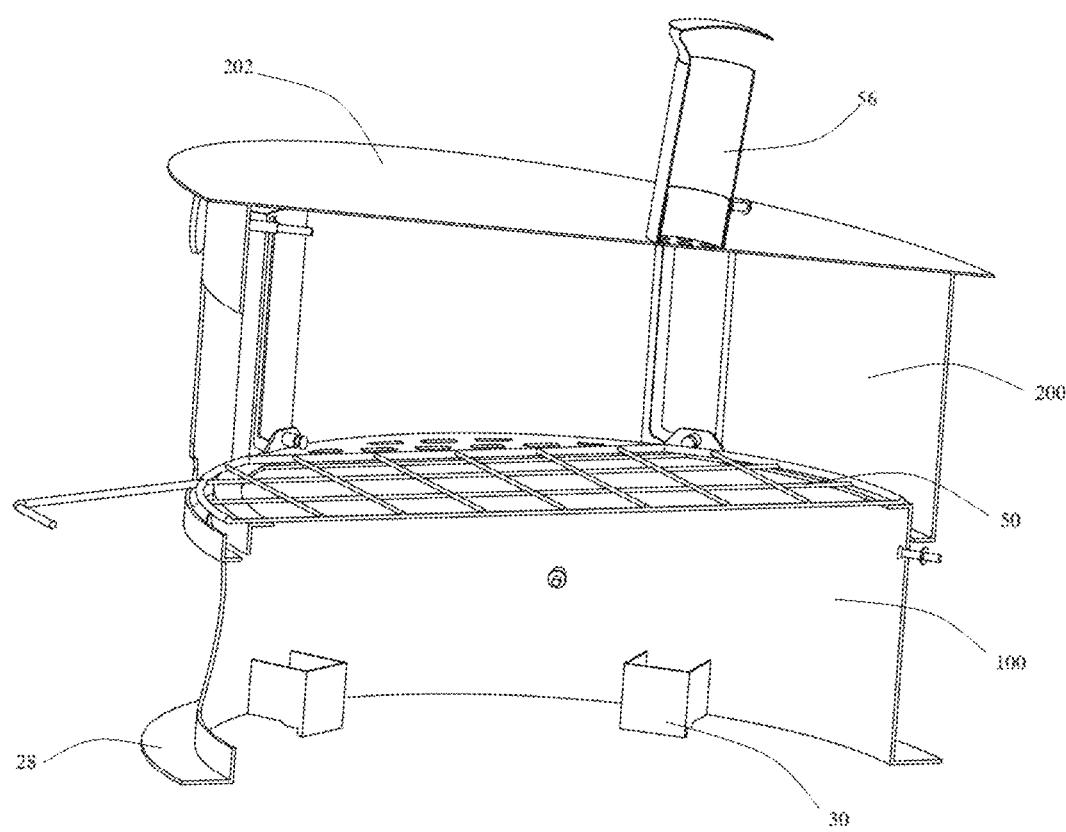
FIG. 5 is a cross-sectional view of the present invention in an expanded position.
Figure 6:
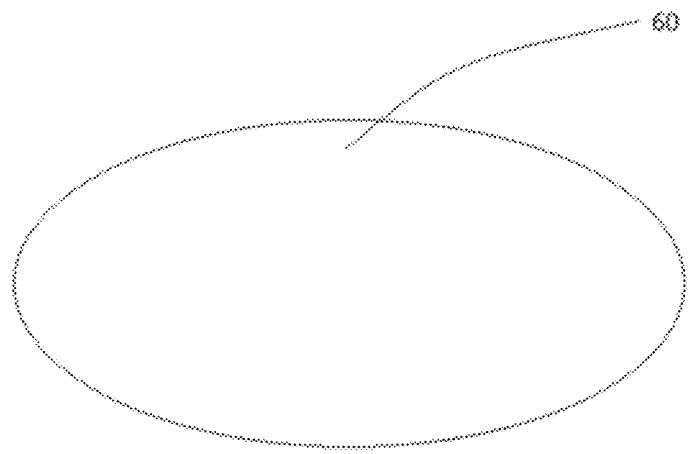
FIG. 6 is a top plan view of the ceramic plate that is placed on the grill of the present invention.

As seen in FIGS. 1-6, the present invention is an improved telescopic pizza oven.

The improved telescopic pizza oven comprises a bottom annular ring 100 that has a top section 100a and a bottom section 100b, the top section 100a of the bottom annular ring 100 defines four upward extensions 10 that are equally spaced apart around a circumference of the bottom annular ring 100, each of the four upward extensions 10 defines a central receiver 12, four pins 14 insert into the four central receivers 12, a left perpendicular platform 16 extends inward from the top section 100a of the bottom annular ring 100, a right perpendicular platform 20 extends inward from the top section 100a of the bottom annular ring 100, a top central rectangular aperture 24 is defined between the left perpendicular platform 16 and the right perpendicular platform 20, a wood insertion lateral aperture 26 is defined on a front section 100c of the bottom annular ring 100, a continuous flat ledge 28 extends outward from the bottom section 100b of the bottom annular ring 100, and four equally spaced guides 30 that extend inward from the bottom section 100b of the bottom annular ring 100. A top annular ring 200 that has a diameter that is greater than that of the bottom annular ring 100 and top annular ring 200 defines a closed top 202, the top annular ring 200 defines a front wall 200a and a rear wall 200b, the rear wall 200b of the top annular ring 200 has a height that is at least one inch smaller than the front wall 200a, at least four equally spaced L-shaped guides 40 that are equally spaced apart and that are defined on an inner wall of the top annular ring 200, the L-Shaped guides 40 are positioned so that a horizontal part 40a of the L-shaped guides 40 runs adjacently to a bottom side 200c of the top annular ring 200 and a vertical part 40b of the L-shaped guides 40 runs upward from the bottom side 200c of the top annular ring 200 toward an upper section 200d of the top annular ring 200, the vertical part 40b of the L-Shaped guides 40 do not pass through the upper section 200c of the top annular ring 200, the L-shaped guides 40 extend inward from the inner wall of the top annular ring 200 and the L-shaped guides 40 do not pierce an outer section of the top annular ring 200, the four pins 14 of the bottom annular ring 100 insert within the four equally spaced L-shaped guides 40 of the top annular ring 200, a food insertion lateral aperture 42 is defined on the front wall 200a of the top annular ring 200, a left bottom guide 44 and a right bottom guide 46 extend outward from a lower section of the food insertion lateral aperture 42. And, a grill 50 that inserts within the left bottom guide 44 and the right bottom guide 46 of the top annular ring 200 that rests on the left perpendicular platform 16 and right perpendicular platform 20 of the bottom annular ring 100.

In an embodiment of the present invention, the telescopic pizza oven comprises a chimney 54 that mounts on the closed top 202.

In another embodiment of the present invention, the telescopic pizza oven comprises a pair of handles 56 that are equally spaced apart and that are attached to an outer section of the top annular ring 200.

In a further embodiment of the present invention, the left perpendicular platform 16 defines a plurality of apertures 18 and the right perpendicular platform 20 defines a plurality of apertures 22.

In still a further embodiment of the present invention, a thermometer 70 is attached to the top annular ring 200.

in still a further embodiment of the present invention, the four pins 14 are screws.

In yet still a further embodiment of the present invention, the telescopic pizza oven comprises of a ceramic plate 60 that is placed on the grill. In a preferred embodiment, the grill is rectangular.

An advantage of the present invention is that it provides an improved telescopic pizza oven that is easy to assemble and disassemble.

Another advantage of the present invention is that it provides an improved telescopic pizza oven that is easily stored and transported.

The embodiments of the improved telescopic pizza oven described herein are exemplary and numerous modifications, combinations, variations, and rearrangements can be readily envisioned to achieve an equivalent result, all of which are intended to be embraced within the scope of the appended claims. Further, nothing in the above-provided discussions of the improved telescopic pizza oven should be construed as limiting the invention to an embodiment or a combination of embodiments. The scope of the invention is defined by the description, drawings, and claims.

What is claimed is:

1. A telescopic pizza oven, the telescopic pizza oven comprises:

a bottom annular ring that has a top section and a bottom section, the top section of the bottom annular ring defines four upward extensions that are equally spaced apart around the circumference of the bottom annular ring, each of the four upward extensions defines a central receiver, four pins that insert into the four central receivers, a left perpendicular platform extends inward from the the top section of the bottom annular ring, a right perpendicular platform extends inward from the the top section of the bottom annular ring, a top central rectangular aperture is defined between the left perpendicular platform and the right perpendicular platform, a wood insertion lateral aperture is defined on a front section of the bottom annular ring, a continuous flat ledge extends outward from the bottom section of the bottom annular ring, and four equally spaced guides that extend inward from the bottom section of the bottom annular ring;

a top annular ring that has a diameter that is greater than that of the bottom annular ring and top annular ring defines a closed top, the top annular ring defines a front wall and a rear wall, the rear wall of the top annular ring has a height that is at least one inch smaller than the front wall, at least four equally spaced L-shaped guides that are equally spaced apart and that are defined on an inner wall of the top annular ring, the L-Shaped guides are positioned so that a horizontal part of the L-shaped guides runs adjacently to a bottom side of the top annular ring and a vertical part of the L-shaped guides runs upward from the bottom side of the top annular ring toward an upper section of the top annular ring, the vertical part of the L-Shaped guides do not pass through the upper section of the top annular ring, the L-shaped guides extend inward from the inner wall of the top annular ring and the L-shaped guides do not pierce an outer section of the top annular ring, the four pins of the bottom annular ring insert within the four equally spaced L-shaped guides of the top annular ring, a food insertion lateral aperture is defined on the front wall of the top annular ring, a left bottom guide and a right bottom guide extend outward from a lower section of the food insertion lateral aperture; and a grill that inserts within the left bottom guide and the right bottom guide of the top annular ring that rests on the left perpendicular platform and right perpendicular platform of the bottom annular ring.

2. The telescopic pizza oven of claim 1, wherein the telescopic pizza oven comprises a chimney that mounts on the closed top.

3. The telescopic pizza oven of claim 2, wherein the telescopic pizza oven comprises a pair of handles that are equally spaced apart and that are attached to an outer section of the top annular ring.

4. The telescopic pizza oven of claim 3, wherein the telescopic pizza oven comprises a ceramic plate.

5. The telescopic pizza oven of claim 1, wherein the left perpendicular platform defines a plurality of apertures, and the right perpendicular platform defines a plurality of apertures.

6. The telescopic pizza oven of claim 1, wherein the four pins are screws.

7. The telescopic pizza oven of claim 1, wherein the grill is rectangular.

8. The telescopic pizza oven of claim 1, wherein the telescopic pizza oven comprises a ceramic plate.

9. The telescopic pizza oven of claim 1, wherein the telescopic pizza oven comprises of thermometer that is attached to the top annular ring.

* * * * *